United States Patent
Kim et al.

(10) Patent No.: US 11,354,343 B2
(45) Date of Patent: Jun. 7, 2022

(54) METHOD AND SYSTEM FOR PROVIDING SEARCH RESULT

(71) Applicant: NAVER Corporation, Seongnam-si (KR)

(72) Inventors: Ji Won Kim, Seongnam-si (KR); Ji Su Lee, Seongnam-si (KR); Hyo Jung Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 526 days.

(21) Appl. No.: 14/800,402

(22) Filed: Jul. 15, 2015

(65) Prior Publication Data
US 2016/0019304 A1 Jan. 21, 2016

(30) Foreign Application Priority Data
Jul. 15, 2014 (KR) .................. 10-2014-0089065

(51) Int. Cl.
*G06F 16/00* (2019.01)
*G06F 16/338* (2019.01)
*G06F 16/332* (2019.01)

(52) U.S. Cl.
CPC .......... *G06F 16/338* (2019.01); *G06F 16/332* (2019.01); *G06F 16/3322* (2019.01)

(58) Field of Classification Search
CPC .......... G06F 17/30696; G06F 17/3064; G06F 16/332; G06F 16/3322; G06F 16/3329; G06F 16/338
USPC ....................................................... 707/722
See application file for complete search history.

(56) References Cited

U.S. PATENT DOCUMENTS

| | | | |
|---|---|---|---|
| 8,577,911 B1* | 11/2013 | Stepinski | G06F 16/3325 707/765 |
| 9,449,080 B1* | 9/2016 | Zhang | G06F 16/3331 |
| 2006/0190483 A1* | 8/2006 | Takahashi | G06F 16/38 |
| 2006/0248061 A1* | 11/2006 | Kulakow | G06F 17/30864 707/999.003 |
| 2007/0112759 A1* | 5/2007 | Kulakow | G06F 17/30646 707/999.005 |
| 2010/0131494 A1* | 5/2010 | Venolia | G06F 17/30991 707/722 |
| 2012/0191577 A1* | 7/2012 | Gonsalves | G06Q 30/06 705/27.2 |
| 2013/0227441 A1* | 8/2013 | Cockcroft | G06F 3/04845 715/760 |
| 2014/0040813 A1* | 2/2014 | McDonald | G06F 17/30991 715/781 |
| 2014/0136509 A1* | 5/2014 | Kritt | G06F 16/951 707/709 |

(Continued)

FOREIGN PATENT DOCUMENTS

| KR | 10-2004-0079604 | 9/2004 |
|---|---|---|
| KR | 10-2008-0106202 | 12/2008 |

(Continued)

*Primary Examiner* — Vincent F Boccio
(74) *Attorney, Agent, or Firm* — Greer Burns & Crain Ltd.

(57) ABSTRACT

A search result providing method implemented in a computer includes providing a search result screen including a search result of a first keyword in response to a search request for the first keyword, and additionally providing a search result of a second keyword on the search result screen in response to a search request for at least one second keyword different from the first keyword.

17 Claims, 9 Drawing Sheets

(56) References Cited

U.S. PATENT DOCUMENTS

| | | | | |
|---|---|---|---|---|
| 2014/0143226 | A1* | 5/2014 | Haveliwala | G06F 16/24578 |
| | | | | 707/706 |
| 2014/0236926 | A1* | 8/2014 | Lisa | G06F 3/04817 |
| | | | | 707/722 |
| 2014/0358733 | A1* | 12/2014 | Achuthan | G06Q 30/0625 |
| | | | | 705/26.62 |
| 2015/0006505 | A1* | 1/2015 | Plakhov | G06F 16/3328 |
| | | | | 707/710 |
| 2015/0020017 | A1* | 1/2015 | Chandler | G06F 16/957 |
| | | | | 715/771 |

FOREIGN PATENT DOCUMENTS

| | | | |
|---|---|---|---|
| KR | 10-0910515 | | 7/2009 |
| KR | 10-2012-0050593 | | 5/2012 |
| KR | 20120072041 A | * | 7/2012 |
| KR | 10-2013-0073613 | | 7/2013 |

\* cited by examiner

METHOD AND SYSTEM FOR PROVIDING SEARCH RESULT

CROSS-REFERENCE TO RELATED APPLICATION

This application claims priority from and the benefit of Korean Patent Application No. 10-2014-0089065, filed on Jul. 15, 2014, the disclosure of which is incorporated herein in its entirety by reference.

BACKGROUND

1. Field

Example embodiments of the present invention relate to a method and system for providing a search result of a keyword.

2. Description of the Background

A search engine refers to software or a website that helps a user easily retrieve data on the Internet. The search engine searches a database for a keyword input from the user, extracts a search result of the keyword from the database, and provides the search result to the user.

The search engine extracts a search result that matches a keyword transmitted from a user terminal through a search page from the database, creates a search result page including the search result, and provides the search result page to the user terminal.

In the search engine according to the related art, a search result page of an independent screen is created for each keyword, in response to an input of a keyword. If a user continuously searches for an additional search result using another keyword such as a related keyword, the user is required to verify the search results by moving to screens one by one since a search result page is created as an individual screen for each keyword.

SUMMARY

Some example embodiments of the present invention provide a search result providing method and system that display search results of a plurality of keywords on a single screen.

Some example embodiments also provide a search result providing method and system that accumulate a search result of a keyword and a search result of a related keyword and thereby display the search results on a single search result screen.

Some example embodiments also provide a search result providing method and system that set a search result of a specific keyword as an initial screen.

According to at least one example embodiment, there is provided a search result providing method configured as a computer, the method including providing a search result screen including a search result of a first keyword in response to a search request for the first keyword, and additionally providing a search result of a second keyword on the search result screen in response to a search request for at least one second keyword different from the first keyword. The second keyword may be a related keyword associated with the first keyword.

Providing of the search result screen may include providing a related keyword associated with the first keyword, and additionally providing of the search result of the second keyword includes adding a search result of the related keyword on the search result screen in response to the selection of the related keyword on the search result screen.

Additionally providing of the search result of the second keyword may include determining search result counts or a search result ratio for each keyword to be displayed on the search result screen based on the number of second keywords.

Additionally providing of the search result of the second keyword may include sorting the search result of the first keyword and the search result of the second keyword on the search result screen in the order of the search requests.

Additionally providing of the search result of the second keyword may include fixing the search result of the first keyword on the top area of the search result screen, and sorting the search result of the second keyword on the remaining area of the search result screen in order of the search requests.

The search result screen may include a single page, and each of documents corresponding to the search result of the first keyword and the search result of the second keyword may be inserted on the search result screen based on a block unit.

The search result providing method may further include providing content related to a document through a viewer on the search result screen in response to the selection of the document corresponding to the search result of the first keyword or the search result of the second keyword.

The first keyword may be a keyword of interest registered in advance, and providing of the search result screen may include recognizing an execution request for a search function as a search request for the first keyword, and providing the search result screen as an initial execution screen of the search function.

According to at least one example embodiment, there is provided a non-transitory computer-readable medium storing computer-readable instructions, when executed by a processor, configured to control a computer system by a method including providing a search result screen including a search result of a first keyword and a second keyword associated with the first keyword in response to a search request for the first keyword, and additionally providing a search result of the second keyword on the search result screen in response to a search request for the second keyword on the search result screen.

According to at least one example embodiment, there is provided a search result providing system including a memory to which at least one program is loaded, and at least one processor. According to a control of the program, the at least one processor is configured to execute a process of providing a search result screen including a search result of a first keyword and a second keyword associated with the first keyword in response to a search request for the first keyword, and a process of additionally providing a search result of the second keyword on the search result screen in response to a search request for the second keyword on the search result screen.

The at least one processor may be further configured to determine search result counts or a search result ratio for each keyword to be displayed on the search result screen based on the number of second keywords.

The at least one processor may be further configured to sort the search result of the first keyword and the search result of the second keyword on the search result screen in the order of the search requests.

The at least one processor may be further configured to fix the search result of the first keyword on a top area of the search result screen, and to sort the search result of the second keyword on the remaining area of the search result screen in the order of the search requests.

The search result screen may include a single page, and each of documents corresponding to the search result of the first keyword and the search result of the second keyword may be inserted on the search result screen based on a block unit.

The at least one processor may be further configured to provide content related to a document through a viewer on the search result screen in response to the selection of the document corresponding to the search result of the first keyword or the search result of the second keyword.

The first keyword may be a keyword of interest registered in advance, and the at least one processor may be further configured to recognize an execution request for a search function as a search request for the first keyword, and to provide the search result screen as an initial execution screen of the search function.

It is to be understood that both the foregoing general description and the following detailed description are explanatory and are intended to provide further explanation of the example embodiments as claimed.

According to at least one example embodiment, since a search result of a keyword and a search result of a related keyword are accumulated and thereby provided on a single search result screen, it is possible to conveniently verify search results of a plurality of keywords without performing a screen transition.

According to at least one example embodiment, since a search result is provided using a feed method by setting a search result of a specific keyword as an initial screen, it is possible to provide a seamless information search and utilization environment.

BRIEF DESCRIPTION OF THE DRAWINGS

The foregoing and other features of the example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
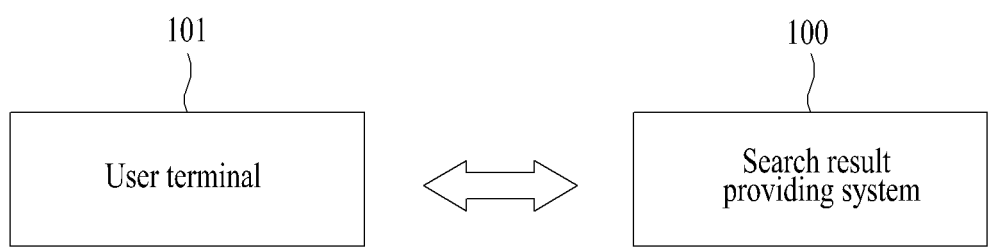
FIG. 1 is a diagram illustrating a relationship between a user terminal and a search result providing system according to one example embodiment.

Example embodiments of the present invention will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein Hereinafter, example embodiments will be described with reference to the accompanying drawings.

At least one example embodiment relates to technology for providing a search result of a keyword, and may be applicable to the field such as an information search service of a search engine or a syndication feed service.

FIG. 1 is a diagram illustrating a relationship between a user terminal 101 and a search result providing system 100 according to one example embodiment. In FIG. 1, an arrow indicator may indicate that data may be transmitted and received over a wired/wireless network between the search result providing system 100 and the user terminal 101.

The user terminal 101 may indicate any type of terminal devices, such as a personal computer (PC), a smartphone, and a tablet, capable of connecting to a website/mobile site associated with the search result providing system 100 or installing and executing a service exclusive application. Here, the user terminal 101 may perform the overall service configuration, such as service screen configuration, data input, data transmission and reception, data storage, or the like, under the control of the website/mobile site or the service exclusive application.

The search result providing system 100 serves as a search engine that provides a search result corresponding to a keyword input from a user. In particular, to provide a search convenience to the user and to support seamless information search and utilization, the search result providing system 100 may provide a search environment in which the user may collectively verify search results of a plurality of keywords, and view the latest search result of a specific keyword using a feed method.

Figure 2:
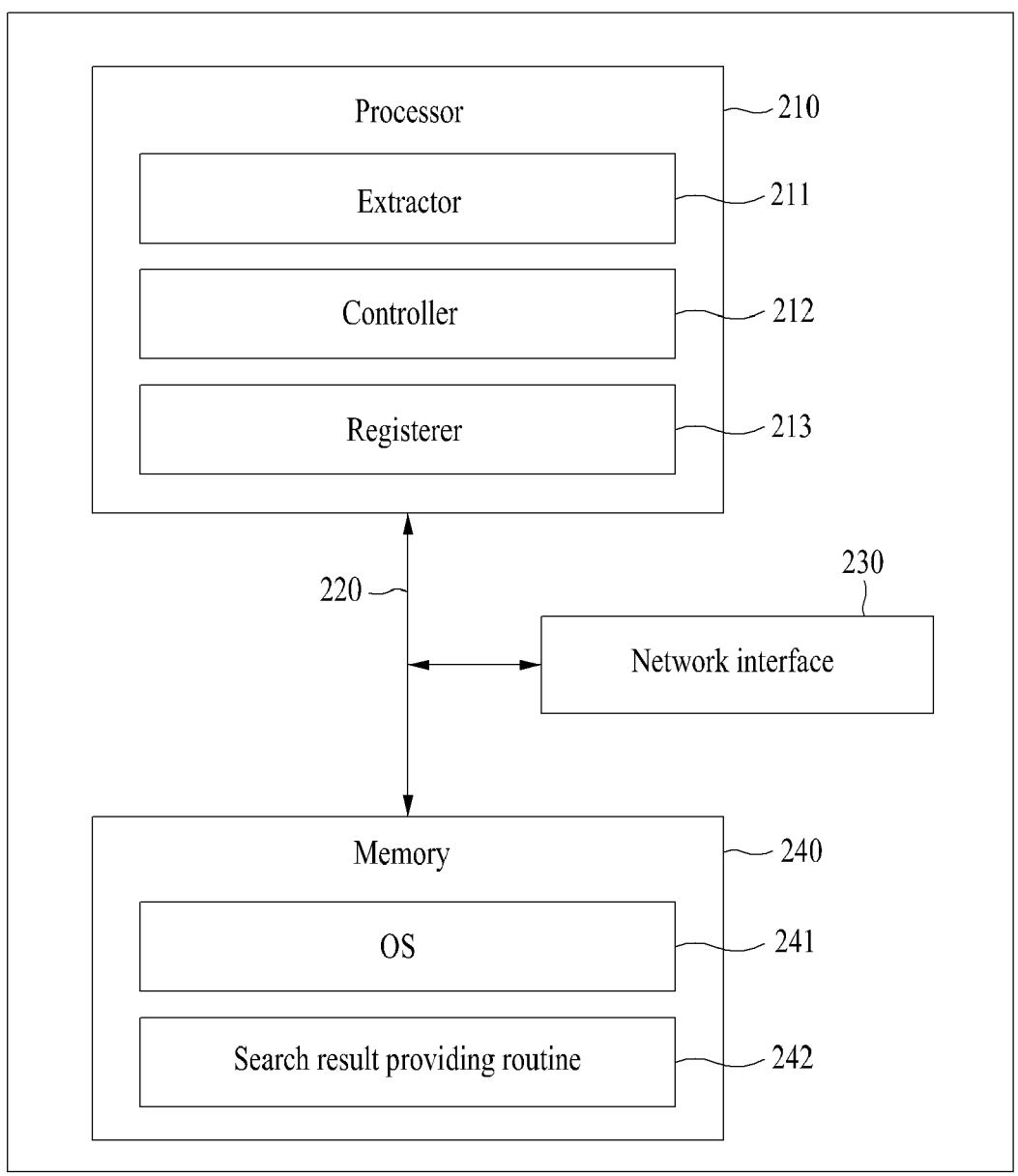
FIG. 2 is a block diagram illustrating a configuration of a search result providing system according to one example embodiment.
Figure 3:
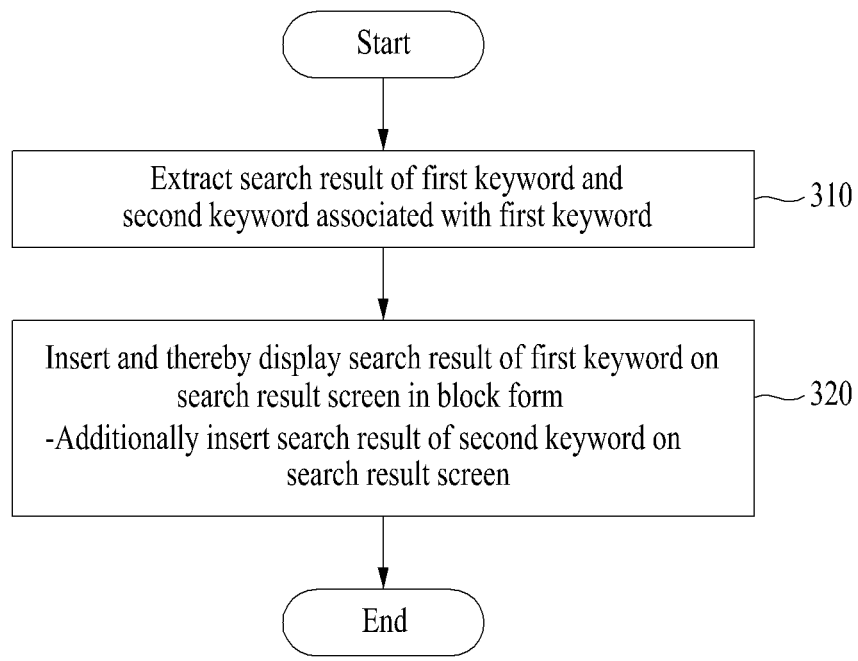
FIG. 3 is a flowchart illustrating a method of providing a search result according to one example embodiment.

FIG. 2 is a block diagram illustrating a configuration of the search result providing system 100 according to one example embodiment, and FIG. 3 is a flowchart illustrating a method of providing a search result according to an example embodiment.

Referring to FIG. 2, the search result providing system 100 is comprised of a number of units or modules including a processor 210, a bus 220, a network interface 230, and a memory 240. The memory 240 may store an operating system (OS) 241 and a search result providing routine 242. The processor 210 includes an extractor 211, a controller 212, and a registerer 213, which are names or units for describing specific functions or operations performed by the processor. According to other example embodiments, the search result providing system 100 may include more number of constituent elements than the number of constituent elements of FIG. 2. However, in many cases, there is no need to clearly illustrate constituent elements according to the related art. For example, the search result providing system 100 may include other constituent elements such as a display or a transceiver.

The memory 240 may include a permanent mass storage device, such as a random access memory (RAM), a read only memory (ROM), or a disc drive, as a computer-readable storage medium. Also, program codes for the OS 241 and the search result providing routine 242, and the like, may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, and a memory card. Software constituent elements may be loaded to the memory 240 through the network interface 230 instead of using the computer-readable storage medium.

The bus 220 enables communication and data transmission between the constituent elements of the search result providing system 100. The bus 220 may be configured using a high-speed serial bus, a parallel bus, a storage area network (SAN), and/or another appropriate communication technology.

The network interface 230 may be a computer hardware constituent element for connecting the search result providing system 100 to the computer network. The network interface 230 may connect the search result providing system 100 to the computer network through a wireless or wired connection.

The processor 210 may be configured to process computer-readable instructions of a computer program by performing the basic calculation, logic, and the input/output operations of the search result providing system 100. The computer-readable instructions may be provided from the memory 240 or the network interface 230 to the processor 210 through the bus 220. The processor 210 is configured to execute program codes or instructions for the extractor 211, the controller 212, and the registerer 213. The program codes or instructions may be stored in a storage device such as the memory 240.

Figure 4:
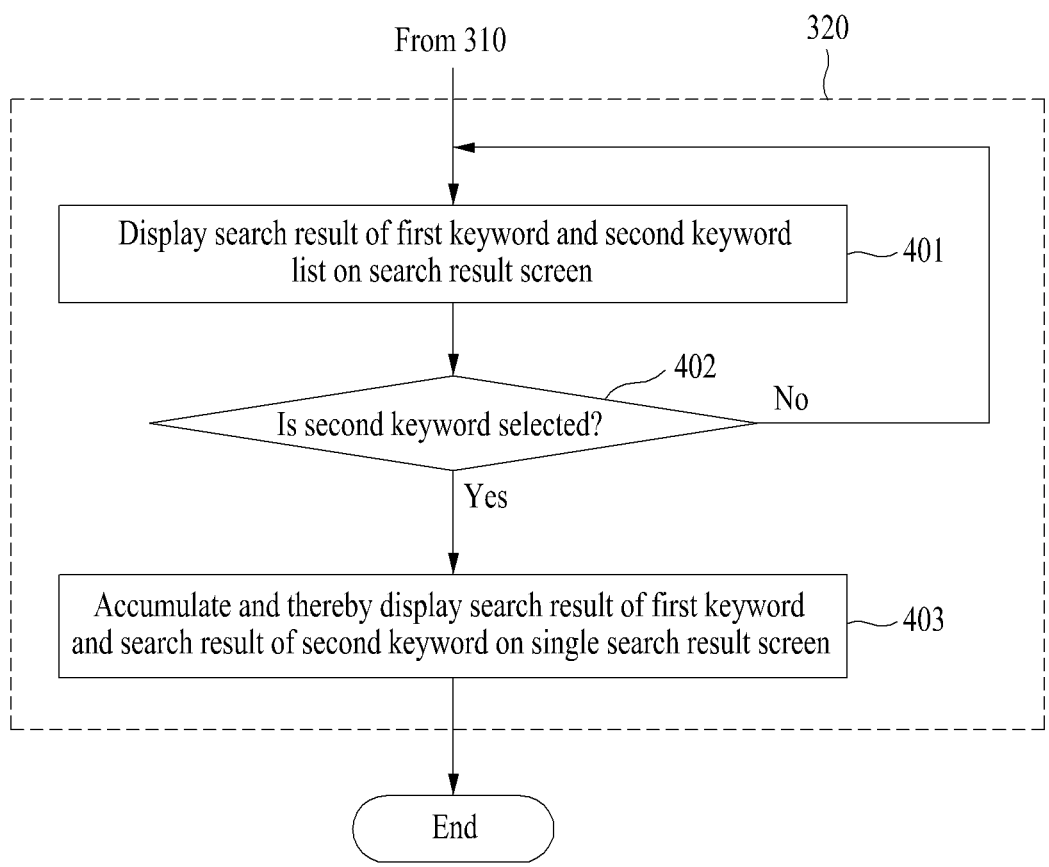
FIGS. 4 through 6 illustrate a process of collecting search results of a plurality of keywords and displaying the collected search results on a single screen according to one example embodiment.
Figure 7:
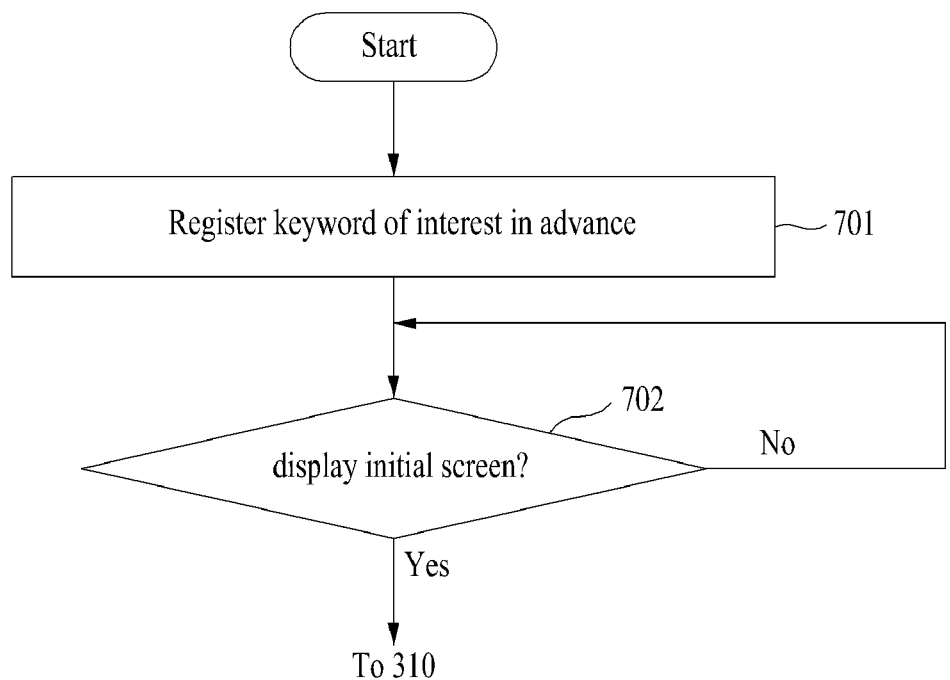
FIG. 7 illustrates an example of a process of entering a search result screen according to one embodiment.

When executed by the processor 210, the computer-readable program codes or instructions associated with the extractor 211, the controller 212, and the registerer 213 enable the processor to perform the operations described in FIG. 3, FIG. 4, and FIG. 7.

In operation 310, the extractor 211 extracts a search result corresponding to a keyword (hereinafter, a first keyword) input from a user. That is, the extractor 211 creates a search result by receiving the first keyword from the user terminal 101 and by receiving a document that matches the received first keyword. Here, the document indicates data to be retrieved by a search engine, and may include, as a search target, typical data such as a database and atypical data such as web data that is retrieved from blogs or a bulletin board. Also, the extractor 211 extracts at least one keyword, for example, a related keyword, (hereinafter, a second keyword) associated with the first keyword during the process of extracting the search result of the first keyword. In this instance, the second keyword that is the related keyword of the first keyword may be extracted using known methods. See, e.g., the related keyword extracting method disclosed in Korean Patent No. 10-0910515 and Korean Patent Publication No. 10-2012-0050593. In response to the user selecting the second keyword, the extractor 211 extracts a document that matches the second keyword, and additionally creates a search result of the second keyword.

In operation 320, the controller 212 provides the extracted search result in response to the first keyword received from the user terminal. In the present example embodiment, the controller 212 configures a screen (hereinafter, a search result screen) for providing the search result as a single page, and displays the search result of the first keyword on the search result screen. In particular, the controller 212 inserts and thereby display each of the documents included in the search result in a block form on the search result screen. Here, the controller 212 provides a second keyword list as a related keyword of the first keyword on the search result screen. In response to the user selecting the second keyword, the controller 212 displays the search result of the second keyword in the block form. In this instance, the controller 212 additionally accumulates and thereby display a search result block of the second keyword on the search result screen including the search result of the first keyword.

FIG. 4 is a flowchart illustrating a search result displaying process according to one example embodiment. Operations 401 through 403 included in the search result displaying process of FIG. 4 are included in operation 320 of FIG. 3, and may be performed by the controller 212 of FIG. 2.

In operation 401, the controller 212 displays the search result of the first keyword and the second keyword on the search result screen in response to a search request for the first keyword.

Figure 5:
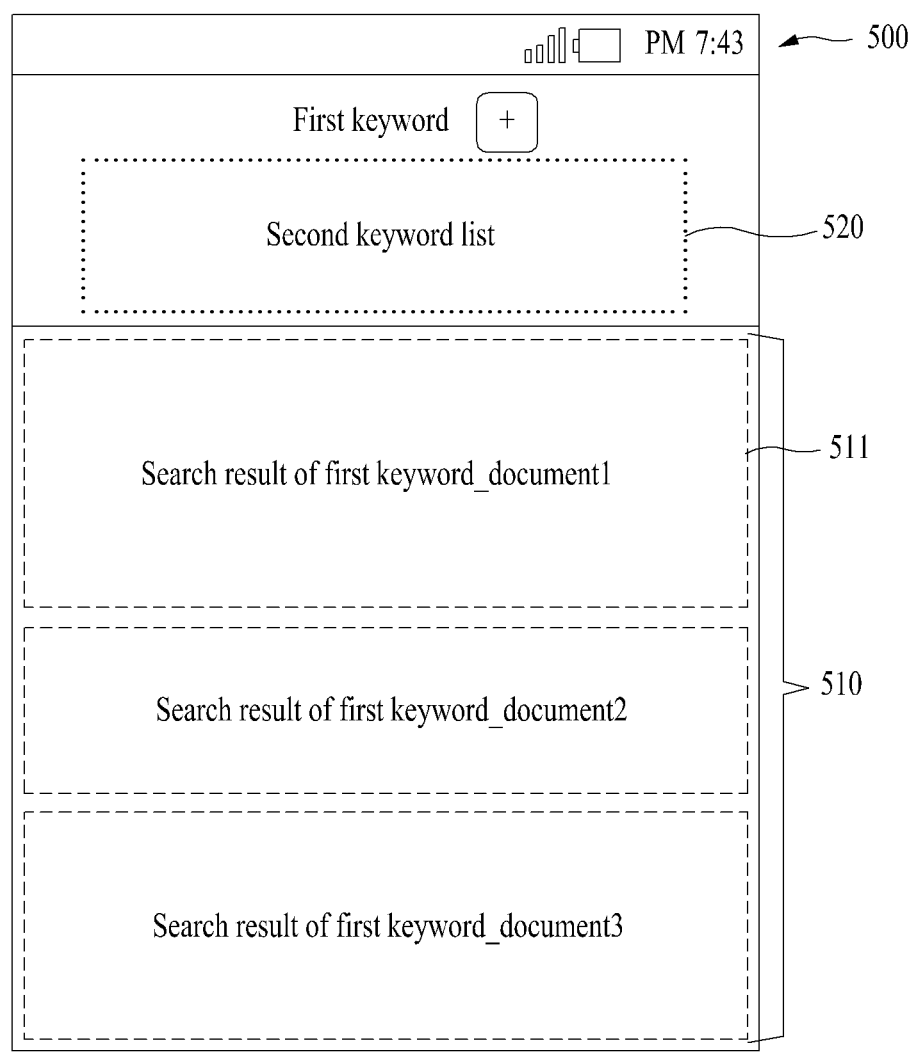

FIG. 5 illustrates an example of an initial screen of a search result screen for providing a search result of a first keyword. Referring to FIG. 5, the controller 212 displays a search result 510 of a first keyword on a search result screen 500 configured as a single page. Here, the controller 212 includes each document included in the search result 510 based on a block unit 511 and thereby display the search result 510. The controller 212 provides a second keyword list 520 as a related keyword of the first keyword together with the search result 510 of the first keyword on the search result screen 500. The second keyword list 520 may be displayed simultaneously together with the search result 510 of the first keyword, or may be processed to be hidden and selectively displayed in response to a user request.

In operations 402 and 403, in response to the user selecting the second keyword from the second keyword list associated with the first keyword, a search request for the second keyword is regarded as being made and the controller 212 additionally inserts the search result of the second keyword and additionally displays the search result of the second keyword on the search result screen on which the search result of the first keyword is displayed, in response to the search request for the second keyword.

Figure 6:
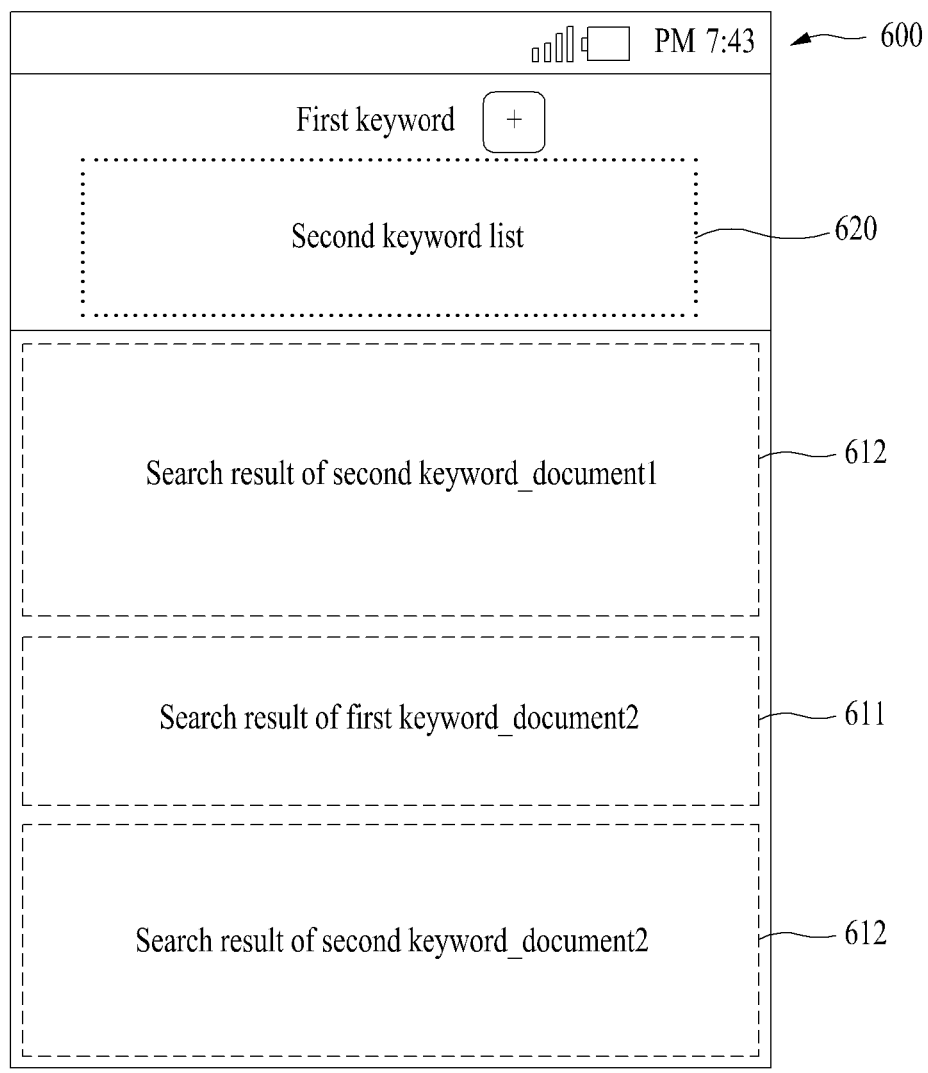

FIG. 6 illustrates an example of a search result adding screen in response to a selection on a second keyword on the search result screen 500 of FIG. 5. Referring to FIG. 6, in response to the selection of a second keyword from a second keyword list 620, the controller 212 additionally displays a block 612 of a search result of the selected second keyword on a search result screen 600 on which a search result 611 of a first keyword is displayed. Also, similarly, in response to a selection on another second keyword on the second keyword list 620, the controller 212 may continuously accumulate and thereby display a search result block of a selected keyword on the search result screen 600.

According to one example embodiment, instead of creating a search result screen for displaying a search result for each keyword and providing the search result through a screen transition, it is possible to collect a search result of a first keyword and a search result of a second keyword and to display search results of a plurality of keywords on a single search result screen without performing a screen transition.

Further, the controller 212 may apply a desired (or alternatively predetermined) sorting standard when accumulating search results and thereby displaying search results of a plurality of keywords on a single search result screen.

For example, the controller 212 may variably determine the number of keyword-by-keyword search results in response to a selection of a second keyword. For example, in the case of an initial screen for providing only the search result of the first keyword, the controller 212 may display N search results with respect to the first keyword and then display N−X (here, N>X) search results with respect to the first keyword in a situation in which a single second keyword is selected. When two second keywords are selected, the controller 212 may display N−(X+Y) (here, N>X, Y) with respect to first keyword A, may display X search results with respect to second keyword ($1^{st}$) and then display Y search results with respect to second keyword ($2^{nd}$). As another example, when the number of documents displayable on the search result screen is determined, the controller 212 may determine a search result display ratio for each keyword based on the selection of the number of second keywords. For example, when a total of six documents are displayable and a single second keyword is selected, the controller 212 may display a search result as first keyword: second keyword=2:1; or first keyword:second keyword=1:1. Also, when two second keywords are selected, the controller 212 may display a search result as first keyword:second keyword ($1^{st}$):second keyword ($2^{nd}$)=3:2:1 or first keyword: second keyword ($1^{st}$):second keyword ($2^{nd}$)=1:1:1. As another example, the controller 212 may continuously accumulate and thereby display the same fixed number of search results with respect to each of the first keyword and the second keyword. Here, the controller 212 may accumulate the search result in keyword selection order, for example, in search request order, that is, in the order in which a corresponding search request is received, and thereby display the accumulated search results so that a history may be easily verified. That is, the controller 212 may display the search result of the first keyword on the bottom and may display the search result of the last selected second keyword on the top. The controller 212 may also display the search results by fixing the search result of the first keyword on the top area of the search result screen and by accumulating the search results of the second keywords in a keyword selection order, for example, in a search request order.

A sorting order between documents to be displayed on the search result screen 600 may be determined based on recentness, correlation with a keyword, and popularity. The determined sorting order may be applied to all the documents included on the search result screen 600 or may be applied based on a keyword unit, i.e., the keyword selected by the user (the first keyword or the second keyword).

A description related to the standards for sorting documents on the search result screen is an example and thus, various standards may be applied to collect and display search results of a plurality of keywords on a single screen. The number of documents or the sorting order of documents to be displayed on the search result screen may be changed.

Further, in response to the user selecting a specific document from the search result displayed on the search result screen, the controller 212 may move to the original page of the document or may provide content of the document through a viewer. Here, the controller 212 may recommend related documents associated with the selected document so that the user may seamlessly search for information on the selected document.

Hereinafter, an example of a process of providing a search result screen will be described with reference to FIG. 7

In general, in response to a keyword input from a user, a keyword input screen is displayed as an initial screen for the user to view a search result screen. As another example, a search result screen associated with a keyword of interest registered in advance by the user may be immediately displayed as the initial screen.

To this end, in operation 701, the registerer 213 registers, as a keyword of interest of the user, a keyword input in advance from the user through a path such as an environment setting (e.g., alarm setting, bookmark, etc.)

In operation 702, in response to an execution of a search function and an entry request into the initial screen, the controller 212 transfers the registered keyword of interest to the extractor 211 as a first keyword, and provides a search result screen including a search result of the extracted first keyword and a second keyword list on an initial execution screen of the search function. That is, by recognizing an approach to the initial execution screen as a search request for the first keyword, the controller 212 provides the search result screen for the keyword of interest, for example, the first keyword through operations 310 and 320 of FIG. 3.

According to one example embodiment, it is possible to display a search result screen about a keyword of interest registered by a user as an initial screen. For example, the search result screen 500 of FIG. 5 may be a search result screen about a one-off input keyword. Alternatively, a keyword of interest may be registered in advance and a search result screen about the keyword of interest may be set as an initial screen so that the user may view a search result using a feed method.

Figure 8:
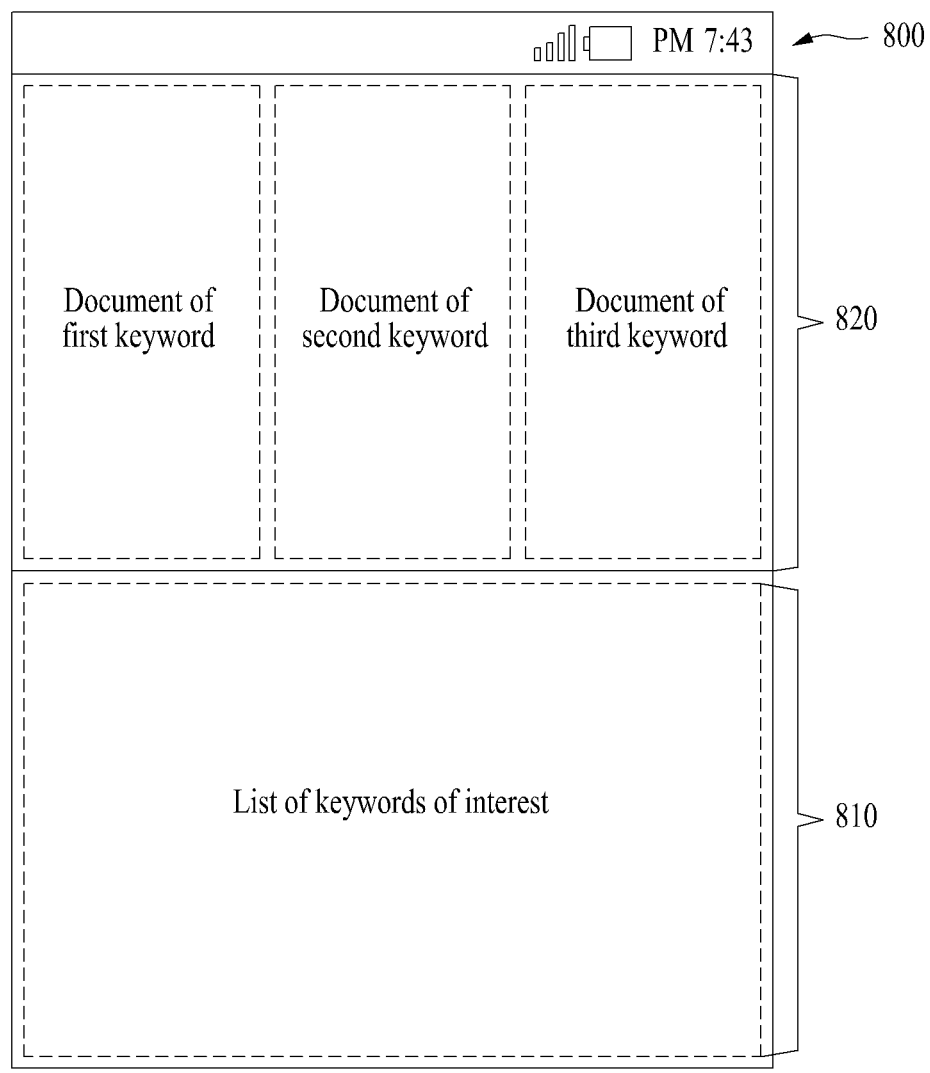
FIG. 8 illustrates an example of an initial screen including a search result of a keyword of interest according to one embodiment.

As another example, when a plurality of keywords of interest is registered by the user, the controller 212 provides an intermediate search screen associated with a previous keyword of interest before providing the search result screen. Here, the controller 212 provides a keywords-of-interest list and a portion of search results for each keyword of interest on the intermediate search screen. For example, referring to FIG. 8, an intermediate search screen 800 includes a list 810 of keywords of interest registered by a user and a search result area 820 including at least a portion of the search results for each keyword of interest. Here, documents may be displayed on the search result area 820 regardless of a keyword. A most recently registered document or a document including a new information feed may be selected from the search results associated with the keyword of interest and preferentially displayed. Further, the list 810 of keywords of interest may be provided with a notice in a corresponding keyword of interest when new information about the keyword of interest is present. In response to a specific keyword selected from the list 810 of keywords of interest, the controller 212 may move to a search result screen (see FIG. 5) for the selected keyword. Also, similarly, in response to selecting a specific document from the search result area 820, the controller 212 may move to the search result screen (see FIG. 5), or may immediately move to the original page of the selected document or may provide content of the selected document through a viewer on the intermediate search screen 800.

The intermediate search screen of the above configuration may be set as the initial screen.

Figure 9:
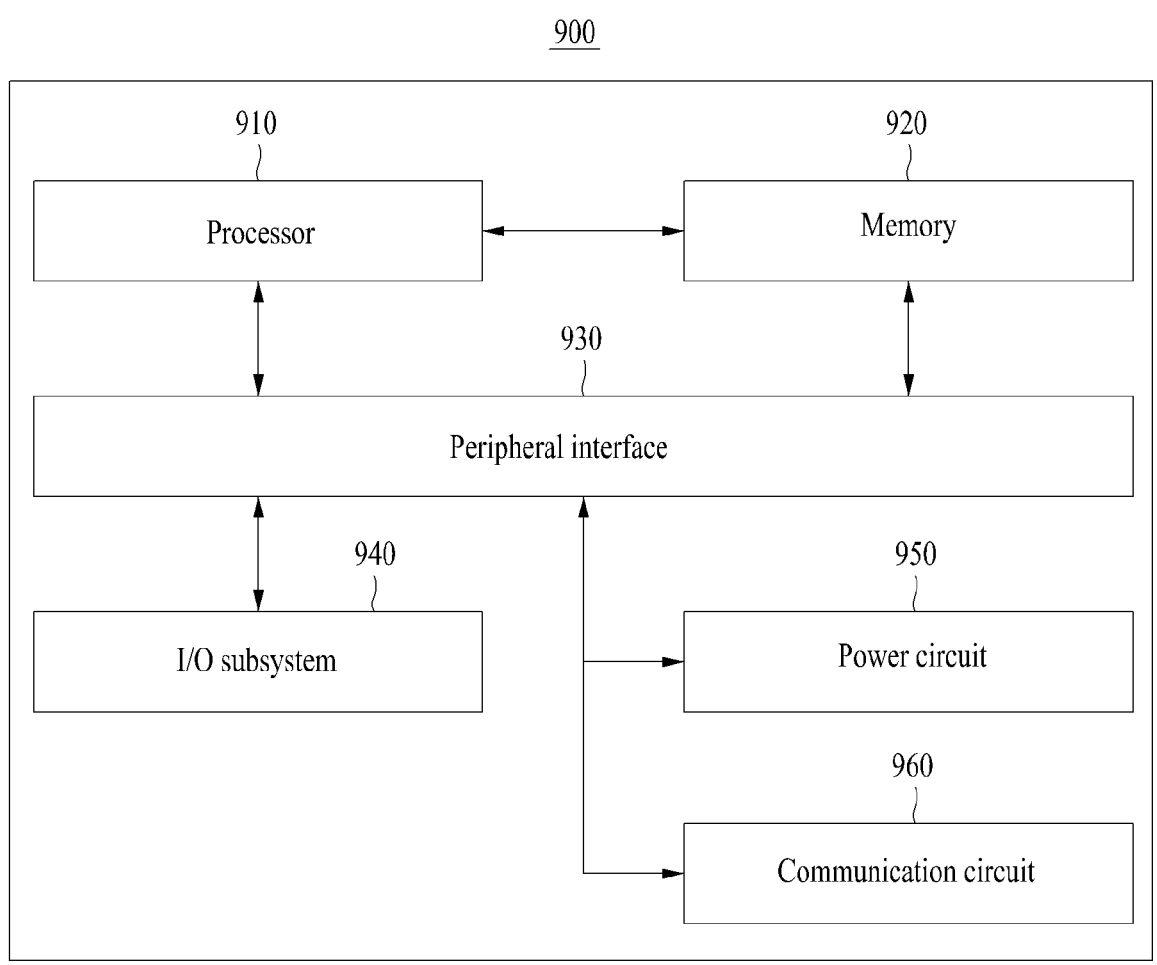
FIG. 9 is a block diagram illustrating an example of a configuration of a computer system according to one embodiment.

FIG. 9 is a block diagram illustrating an example of a configuration of a computer system according to one example embodiment. Referring to FIG. 9, the computer system 900 includes at least one processor 910, a memory 920, a peripheral interface 930, an input/output (I/O) subsystem 940, a power circuit 950, and a communication circuit 960. Here, the computer system 900 may correspond to a user terminal.

The memory 920 may include, for example, a high-speed random access memory (HSRAM), a magnetic disk, a static random access memory (SRAM), a dynamic RAM (DRAM), read only memory (ROM), a flash memory, and a non-volatile memory. The memory 920 may include a software module, an instruction set, or a variety of data required for an operation of the computer system 900. Here, an access from another component such as the processor 910 and the peripheral interface 930 to the memory 920 may be controlled by the processor 910.

The peripheral interface 930 may couple an input device and/or output device of the computer system 900 with the processor 910 and the memory 920. The processor 910 may perform a variety of functions for the computer system 900 and process data by executing the software module or the instruction set stored in the memory 920.

The I/O subsystem 940 may couple various I/O peripheral devices with the peripheral interface 930. For example, the I/O subsystem 940 may include a controller for coupling the peripheral interface 930 and a peripheral device such as a monitor, a keyboard, a mouse, a printer, and a touch screen or a sensor depending on a necessity. The I/O peripheral devices may be coupled with the peripheral interface 930 without using the I/O subsystem 940.

The power circuit 950 may supply a power to all of or a portion of components of a terminal. For example, the power circuit 950 may include a power management system, at least one power source such as a battery and alternating circuit (AC), a charge system, a power failure detection circuit, a power converter or inverter, a power status indicator, or other components for creating, managing and distributing power.

The communication circuit 960 enables communication with another computer system using at least one external port. Alternatively, as described above, the communication circuit 960 may enable communication with another computer system by including a radio frequency (RF) circuit and thereby transmitting and receiving an RF signal known as an electromagnetic signal.

The example embodiment of FIG. 9 is only an example of the computer system 900. The computer system 900 may have a configuration or an arrangement for omitting a portion of the components illustrated in FIG. 9, further including components not illustrated in FIG. 9, or coupling two or more components. For example, a computer system for a communication terminal of a mobile environment may further include a touch screen, a sensor, and the like, in addition to the components of FIG. 9. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 960. Components includable in the computer system 900 may be configured as hardware that includes an integrated circuit specified for at least one signal processing or application, software, or a combination of hardware and software.

The methods according to the example embodiments of the present invention may be configured in a program instruction form executable through various computer systems and thereby recorded in non-transitory computer-readable media.

A program according to the example embodiments of the present invention may be configured as a PC-based program or an application exclusive for a mobile terminal. A search result providing App according to the example embodiments may be configured in an in-app form of a specific application, for example, a messenger program, and may be operable on the specific application.

Further, the methods according to the example embodiments of the present invention may be performed in such a manner that the search result providing App controls the user terminal. The application according to the example embodiments may be installed in the user terminal through a file provided from a file distribution system. As an example, the file distribution system may include a file transmitter (not shown) configured to transmit the file in response to a request from the user terminal.

As described above, according to the example embodiments, since a search result of a keyword and a search result of a related keyword are accumulated and thereby provided on a single search result screen, it is possible to conveniently verify search results of a plurality of keywords without performing a screen transition. Also, according to some example embodiments, since a search result is provided using a feed method by setting a search result of a specific keyword as an initial screen, it is possible to provide a seamless information search and utilization environment.

The units and/or modules of the search result providing system 100 described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments of the present described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A search result providing method implemented in a computer in communication with the Internet and having a search engine for performing a search on the Internet, the method comprising:
    registering, on the computer, a plurality of keywords of interest input by a user of the computer;
    providing to the user, on the computer, an intermediate screen displaying both a list of the registered plurality of keywords of interest input in advance in the computer by the user and at least one document corresponding to each of the registered plurality of keywords of interest, prior to conducting a search on the Internet by the user;
    providing on the computer, a search result screen displaying a first search result page showing a list of first search results found on the Internet in a first search by the search engine and a list of second keywords, in response to a selection of a document corresponding to a first keyword among the plurality of keywords of interest from the intermediate screen by the user on the computer; and
    additionally showing on the first search result page, a list of second search results found on the Internet in a second search, by the search engine, of only a second keyword response to a selection of the second keyword from the list of second keywords by the user on the computer;
    wherein at least one first search result from the list of first search results displayed on the first search result page and at least one second search result are configured to be displayed together on the first search result page based on at least one of a plurality of predetermined sorting standards without displaying a separate second search result page for the second search.

2. The method of claim 1, wherein the second keywords are related keywords associated with the first keyword.

3. The method of claim 1, wherein the additionally showing of the second search results of the second keyword comprises determining a number of documents displayable on the first search result page and a ratio of a number of documents in the first search results for the document selected from the intermediate screen and a number of documents to be displayed on the first search result page based on a number of second keywords selected by the user.

4. The method of claim 1, wherein the sorting standards includes displaying the first search results of the document selected from the intermediate screen and the second search results of the second keyword on the first search result page in order of the search request for the document selected from the intermediate screen and the search request for the second keyword.

5. The method of claim 1, wherein the additionally showing of the second search results of the second keyword comprises fixing the first search results of the document selected from the intermediate screen on a top area of the first search result page, and sorting the second search results of the second keyword on a remaining area of the first search result page in order of the search request for the second keyword.

6. The method of claim 1, wherein each of the documents corresponding to the first search results of the document selected from the intermediate screen and the second search results of the second keyword is inserted on the first search result page based on a block unit.

7. The method of claim 1, further comprising:
providing content related to a document through a viewer on the search result screen in response to a selection of the document corresponding to the first search results of the document selected from the intermediate screen or the second search results of the second keyword.

8. The method of claim 1, wherein the at least one of the plurality of predetermined sorting standards comprises:
displaying N-X number of documents in the first search results of the document selected from the intermediate screen and X number of documents in the second search results of the second keyword on the first search result page, where N>X,
displaying a predetermined ratio of the number of the documents in the first search results of the document selected from the intermediate screen to the number of the documents in the second search results of the second keyword, and
displaying a same fixed number of the documents in the first search results of the document selected from the intermediate screen and the number of the documents in the second search results of the second keyword.

9. A non-transitory computer-readable recording medium storing computer-readable instructions for performing a search on the Internet, the instructions, when executed by a processor, control a computer in communication with the Internet and having a search engine for performing a search on the Internet to perform the steps comprising:
registering, on the computer, a plurality of keywords of interest input by a user of the computer;
providing to the user, on the computer, an intermediate screen displaying both a list of the registered plurality of keywords of interest input in advance in the computer by the user and at least one document corresponding to each of the registered plurality of keywords of interest, prior to conducting a search on the Internet by the user;
providing on the computer, a search result screen displaying a first search result page showing a list of first search results found on the Internet in a first search by the search engine and a list of second keywords, in response to a selection of a document corresponding to a first keyword among the plurality of keywords of interest from the intermediate screen by the user on the computer; and
additionally showing on the first search result page, a list of second search results found on the Internet in a second search, by the search engine, of only a second keyword in response to a selection of the second keyword from the list of second keywords by the user on the computer;
wherein at least one first search result from the list of first search results displayed on the first search result page and at least one second search result are configured to be displayed together on the first search result page based on at least one of a plurality of predetermined sorting standards without displaying a separate second search result page for the second search.

10. The non-transitory computer-readable recording medium of claim 9, wherein the at least one of the plurality of predetermined sorting standards comprises:
displaying N-X number of documents in the first search results of the document selected from the intermediate screen and X number of documents in the second search results of the second keyword on the first search result page, where N>X,
displaying a predetermined ratio of the number of the documents in the first search results of the document selected from the intermediate screen to the number of the documents in the second search results of the second keyword, and
displaying a same fixed number of the documents in the first search results of the document selected from the intermediate screen and the number of the documents in the second search results of the second keyword.

11. A search result providing system in communication with the Internet and having a search engine for performing a search on the Internet, the system comprising:
a display panel;
a memory to which at least one program is loaded; and
at least one processor,
wherein, according to a control of the program, the at least one processor is configured to process the functions including:
registering, in the memory, a plurality of keywords of interest input by a user of the computer;
providing to the user, on the display panel, an intermediate screen displaying both a list of the registered plurality of keywords of interest input in advance in the memory by the user and at least one document corresponding to each of the registered keywords of interest, prior to conducting a search on the Internet by the user;
providing on the display panel, a search result screen displaying a first search result page showing a list of first search results found on the Internet in a first search by the search engine and a list of second keywords, in response to a selection of a document corresponding to a first keyword among the plurality of keywords of interest from the intermediate screen by the user; and
additionally showing on the first search result page, a list of second search results found on the Internet in a second search, by the search engine, of only a second keyword in response to a selection of the second keyword from the list of second keywords by the user;
wherein at least one first search result from the list of first search results displayed on the first search result page and at least one second search result are configured to be displayed together on the first search result page based on at least one of a plurality of predetermined sorting standards without displaying a separate second search result page for the second search.

12. The search result providing system of claim 11, wherein the at least one processor is further configured to determine a number of documents displayable on the first search result page and a ratio of a number of documents in the first search results for the document selected from the intermediate screen and a number of documents to be displayed on the first search result page based on a number of second keywords selected by the user.

13. The search result providing system of claim 11, wherein the sorting standards further includes displaying the first search results of the document selected from the intermediate screen and the second search results of the second keyword on the first search result page in order of the search request for the document selected from the intermediate screen and the search request for the second keyword.

14. The search result providing system of claim 11, wherein the at least one processor is further configured to fix the first search results of the document selected from the intermediate screen on a top area of the first search result page, and to sort the second search results of the second keyword on a remaining area of the first search result page in order of the search request for the second keyword.

15. The search result providing system of claim 11, wherein each of the documents corresponding to the first search results of the document selected from the intermediate screen and the second search results of the second keyword is inserted on the first search result page based on a block unit.

16. The search result providing system of claim 11, wherein the at least one processor is further configured to provide content related to a document through a viewer on the search result screen in response to a selection of the document corresponding to the first search results of the document selected from the intermediate screen or the second search results of the second keyword.

17. The search result providing system of claim 11, wherein the at least one of the plurality of predetermined sorting standards comprises:
   displaying N-X number of documents in the first search results of the document selected from the intermediate screen and X number of documents in the second search results of the second keyword on the first search result page, where N>X,
   displaying a predetermined ratio of the number of the documents in the first search results of the document selected from the intermediate screen to the number of the documents in the second search results of the second keyword, and
   displaying a same fixed number of the documents in the first search results of the document selected from the intermediate screen and the number of the documents in the second search results of the second keyword.

* * * * *